(12) United States Patent
Stummann

(10) Patent No.: US 6,673,324 B2
(45) Date of Patent: Jan. 6, 2004

(54) PROCESS AND APPARATUS FOR THE REMOVAL OF DUST IN A REACTION ZONE

(75) Inventor: Troels Dahlgaard Stummann, Copenhagen S (DK)

(73) Assignee: Haldor Topsoe A/S, Lyngby (DK)

( * ) Notice: Subject to any disclaimer, the term of this patent is extended or adjusted under 35 U.S.C. 154(b) by 43 days.

(21) Appl. No.: 09/752,433

(22) Filed: Jan. 3, 2001

(65) Prior Publication Data

US 2001/0048910 A1 Dec. 6, 2001

Related U.S. Application Data

(60) Provisional application No. 60/174,834, filed on Jan. 7, 2000.

(51) Int. Cl.$^7$ ............. B01D 46/00; C01B 17/74
(52) U.S. Cl. ............. 423/210; 423/215.5; 423/533; 423/534; 423/535; 423/538; 423/540
(58) Field of Search ............. 423/210, 215.5, 423/533, 534, 535, 538, 540; 95/273, 274; 210/749, 767; 55/318, 419, 482, 485

(56) References Cited

U.S. PATENT DOCUMENTS

| | | | |
|---|---|---|---|
| 2,452,569 A | | 11/1948 | Houdry ............. 196/49 |
| 3,671,194 A | * | 6/1972 | Roberts ............. 423/538 |
| 3,875,294 A | * | 4/1975 | Reh et al. ............. 423/534 |
| 4,046,866 A | * | 9/1977 | Hurlburt et al. ............. 423/533 |
| 4,212,855 A | * | 7/1980 | Kerner et al. ............. 423/522 |
| 4,512,147 A | * | 4/1985 | Wong ............. 60/274 |
| 6,149,886 A | | 11/2000 | Schoubye ............. 423/242.1 |

FOREIGN PATENT DOCUMENTS

| | | |
|---|---|---|
| FR | 862057 | 2/1941 |
| GB | 524613 | 2/1939 |

\* cited by examiner

*Primary Examiner*—Stanley S. Silverman
*Assistant Examiner*—Timothy C. Vanoy
(74) *Attorney, Agent, or Firm*—Dickstein Shapiro Morin & Oshinsky, LLP

(57) ABSTRACT

A process for treating a dust containing, gaseous or liquid feed stream in a reactor containing a plurality of particle beds, which have the capability, once the pressure drop across a bed has reached a maximum allowable level, to distribute most of the feed stream to a point directly upstream of each of the subsequent beds in a series, stepwise manner. The beds contain particles in the form of pellets, cylinders, granules, rings, or mixtures thereof, and at the end of an operation period, the primary fraction of the feed flow is directed through the downstream-most bed in the reactor. By providing for removal of dust in each of the beds, the process enables the reactor to operate with a conventional pressure drop profile, but for an extended on-stream period of time.

7 Claims, 3 Drawing Sheets

PROCESS AND APPARATUS FOR THE REMOVAL OF DUST IN A REACTION ZONE

This application claims the benefit of U.S. Provisional Application No. 60/174,834, filed Jan. 7, 2000.

BACKGROUND OF THE INVENTION

1. Field of the Invention

This invention relates to a process for the prolonged removal of dust inside a reaction zone on stream. The invention provides further an apparatus being useful in the process.

2. Description of the Related Art

The present invention concerns the dedusting of a feed stream being introduced into a reactor loaded with particles. Dedusting is performed inside the reactor simultaneously with chemical and/or physical reactions.

Those reactions include catalytic and non-catalytic heterogeneous reactions, absorption and adsorption. The dust containing feed may be in the gaseous or liquid form.

Plugging of reactors by dust contained in the feed stream is a well-known problem in the industry. More specifically, in processes involving reactors loaded with one or more beds of particles, dust contained in the feed is deposited on and within particle layers contained in the reactor and finally plugs the reactor. The type of particles loaded usually comprises pellets, cylinders, granules, extrudates, rings or mixtures thereof, of which some may not be active in the desired reaction. Those particles are mentioned as inert particles as opposed to active particles on which the actual reactions perform. Build-up of dust in the reactor primarily takes place in and above the top of the particle layer of the reactor and only to a small degree in the particle layer downstream the inlet end. The depth of dust deposition at top of the particle layer depends amongst other parameters on type of the dust and size of the particles in the layer.

As the dust builds up at top of the particle layer, it gradually fills in the void between the particles and pressure drop across the layer inherently increases. Pressure drop increase is an exponential function of the amount of dust deposited and thus of the time on stream.

Even a small concentration of dust in a feed stream will in time cause the building of a critical pressure drop across the reactor, which makes cleaning or a replacement of the bed layer/s necessary.

Therefore, it may not be a solution to install a dust filters up stream the reactor. This is e.g. the case with hot gases, where electro filters or filter bags are used, thus, where the concentration of dust in the purified stream is typically not reduced to below 2–5 mg/Nm$^3$.

In some processes the time for the building of pressure drop across a reactor to a maximum allowable value is defining the maximum time of continuous operation. In many chemical process plants, it is rather time consuming to close down the plant and restart it, meaning that the cash value of production lost in the meantime is considerable.

It is thus a general object of the invention to prolong the period of continuous operation, thereby increasing the on-stream factor of a plant treating dust containing fluids.

The period of continuous operation limited by the build-up of dust inside a reactor can be prolonged in several ways.

1. The process plant can be designed for a larger pressure drop.

2. Two or more reactors can be placed in parallel, so that one is being cleaned or emptied and reloaded, whilst the other/s are in operation.

3. A larger cross sectional area of the reactor than usually applied can be chosen.

Solution 1 implies an increase of both plant investment and production cost, as the feed stream supplied to the specific plant section in question should be delivered at a higher pressure and/or the down stream section should accept/make up for an effluent stream at a lower pressure than otherwise. Solution 1 will be useful only for a short prolongation, as the pressure drop increases exponentially with operation time.

The drawback of solution 2 is that the investment of the actual reactor is increased considerably. If the reactor in normal operation is at high temperature, further equipment of cooling and reheating is required. Furthermore, in case of a moist dust containing gas feed, condensation may unintentionally occur on cold surfaces during cooling.

In several cases condensation implies operation problems. For instance if the gas contains components which form corrosive substances in the condensate, channels, tubes and equipment subjected to the condensate may be corroded, if these are not constructed from a material resistant to the corrosive conditions. In some processes solids may condense and plug the particle layer, valves or narrow passages in the equipment used for cooling the process gas for regeneration. Condensation may also lead to deterioration of the particles, if these are sensitive to liquid.

The main disadvantage of solution 3 is that a larger cross sectional area leads to inappropriate dimensions of the reactor, especially pressure equipment is disadvantageously imposed a tangent height/diameter ratio, which considerably raises the price of the reactor.

SUMMARY OF THE INVENTION

This invention provides a process and a reactor being able to operate on a dust containing streams at a pressure drop profile similar to that of conventional reactor, however, with an increased on-stream factor, by dividing the particle layer of the reactor in at least two divisions (beds) and introducing the feed stream into the reactor above the first and in between each of these divisions.

When distributing the feed gas from the first particle bed to subsequent beds, as the pressure drop builds up from the initial to the maximum allowable in the individual beds, the on-stream period is advantageously prolonged.

Distribution of gas into the reactor is typically performed by means of bypass tubes and valves connecting the reactor sections above each particle bed with the respective reactor section above the following neighbouring particle bed, or alternatively the feed gas tube is connected to a manifold supplying the individual beds of the reactor by adjusting the valves in the individual manifold tubes.

The tube line to the top layer is kept open when hot moist gases are employed in reactors with particles being sensitive to liquid. Opening of the first bypass/admission valve will restrict flow through the first bed, however, not eliminate the flow, which serves to keep all of the particle layers warm and avoid condensation.

By the method and reactor according to the invention, the area in which the dust may build up is increased. When, as preferred, the additional number of installed beds are subjected to the filtering of the dust particles have identical cross sectional area, the maximum operation time on stream is increased proportionately with the additional number of beds. Thus, e.g. by dividing the layer of particles in the reactor into two beds of identical cross sectional area and introducing the main fraction of the feed stream to each of these in series, the area of deposition is doubled.

Preferably, the beds of particles foreseen for dedusting are not much higher than the height of the maximum depth of dust deposition, depending on the type of the actual dust particles.

Advantageously, the valves used for the bypass application need not to be fluid tight. A moderate leakiness of a by-pass valve will have no severe influence on the operation of the reactor, as long as the dust deposited upon/in the particle bed in connection with the leaking by-pass valve does not develop a pressure drop of an order of magnitude comparable to the maximum allowable.

When at the end of an operation period the primary fraction of feed flow is solely directed through the last bed in the reactor, the reactor must still operate satisfactorily. If the reaction taking place is catalytic, the last bed of the reactor must then be able to perform the conversion. In this case all of the bed volume above the last is to be considered extra volume.

When the reaction taking place is absorption, adsorption takes place between components of the fluid and components of the particles, the activity of the particles is reduced with the building up of dust down through the particle bed. Thus, the loss of function of the particles is reduced, when the upper particle beds are bypassed one by one, as at least a fraction of the bypassed particles have already served their purpose. Preferably, the size and shape of particles are chosen such that the loss of the capacity of the particles is minimised.

The sum of heights of the bed layers, corresponding to the volume of the particles, compared to a conventional reactor is larger, meaning that also the height of the reactor is increased. However, compared to solution 3 the reactor is only increased in the direction of its length, which is an increment of reactor volume.

DETAILED DESCRIPTION OF THE PREFERRED EMBODIMENTS

Figure 1:
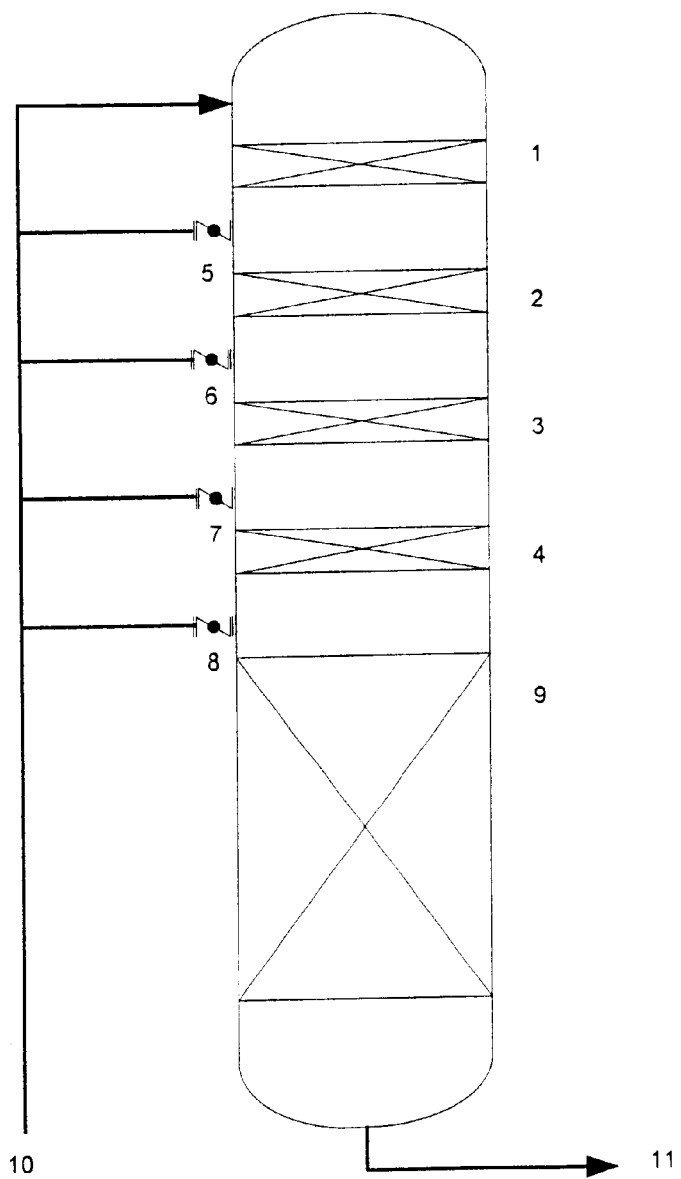
FIG. 1 is a schematic illustration of a dedusting/reaction vessel according to an embodiment of the present invention.

FIG. 1 is a schematic illustration of a dedusting/reaction vessel according to an embodiment of the present invention.

Referring to FIG. 1 the dedusting/reaction vessel comprises a reactor shell provided with 5 beds of particles (1, 2, 3, 4, and 9), the 4 top beds providing extra dedusting capacity for the reactor.

Dust containing feed gas (10) is introduced into the reactor through tubes equipped with valves (5, 6, 7, and 8), distributing the feed gas via nozzles in the reactor wall (not shown). The nozzles are positioned, so that the feed gas is introduced above or between the beds.

Dedusted and reacted gas stream is withdrawn from the outlet (11) of the apparatus.

The valve sequence during one continuous period of operation proceeds as follows:

At the beginning, all bypass valves (5–8) are closed. When dust has accumulated in the top of the first bed (1) such that the pressure drop across the reactor has reached its maximum, bypass valve 5 is opened. The pressure drop across the reactor then approximately reduces to its original value. The feed stream is then mainly directed to second bed (2), however, a small fraction of the feed stream still flows through the original inlet of the reactor. When dust has accumulated in bed (2) and the pressure drop across the reactor has reached its maximum, bypass valve 6 is opened and valve 5 is closed. The pressure drop is then reduced to its original value. The feed stream is in this process cycle directed to bed (3), whilst a small fraction is maintained through the bed (1) and bed (2).

The above procedure is repeated in operating subsequent beds and the respective bypass valves until the primary fraction of the feed gas flows through the last main bed. When dust has built up in the last main bed such that the pressure drop across the reactor has reached its critical level, the reactor must be shut down and the beds of particles must be cleaned, regenerated or replaced, depending on the type of dust, particles and reaction taking place.

EXAMPLE 1

In a plant for the regeneration of sulphuric acid, spent sulphuric acid is incinerated to form a gas containing dust and $SO_2$. After filtration in an electro filter and addition of process air, the process gas contains 2 mg/Nm³ of dust.

The amount of $SO_2$ contained in the process gas is subsequently oxidised to $SO_3$ over a $V_2O_5$ sulphuric acid catalyst in a $SO_2$ oxidation reactor.

Figure 2:
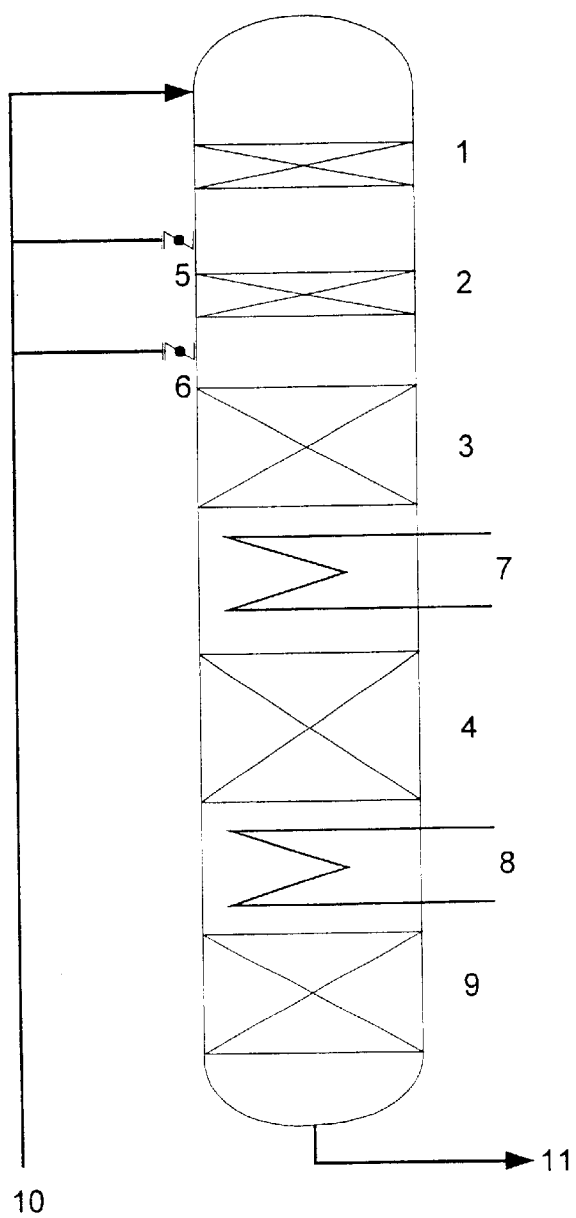
FIG. 2 is a schematic illustration of an $SO_2$ oxidation reactor according to an embodiment of the present invention.

In a specific embodiment of the process of the present invention, the reactor of the type shown in FIG. 2 is operated as an $SO_2$ oxidation reactor in a 240 MTPD (metric ton per day) plant for the regeneration of sulphuric acid.

Above the usual three beds 3, 4 and 9 of catalyst particles are arranged two additional beds 1 and 2 of catalyst particles. Interstage cooling is provided by means of heat exchangers 7 and 8 between catalyst beds 3,4 and 9.

The flow rate of dust containing process gas 10 is 43000 Nm³/h.

Process gas feed 10 is introduced into the reactor via the main inlet at top of the reactor, and via by-pass valves 5 and 6. Dedusted reacted process gas (11) is withdrawn from bottom of the reactor.

During a first period of operation, the process gas is introduced via the main inlet at top of the reactor and substantially all amounts of dust will be captured in the upper 100 mm of first catalyst bed 1. After 1 year of operation, the pressure drop over the first bed of catalyst 1 increases from 6 mbar to 15 mbar. A conventional reactor has to be shut down for cleaning of the catalyst.

In the reactor according to the invention, the first bed is then bypassed with the main part of the process gas. The gas is passed via bypass valve 5 above second bed 2. When the pressure drop in the second bed has increased from about 6 mbar to about 15 mbar, the second bed is bypassed by closing bypass valve 5 and opening bypass valve 6, and the main fraction of the gas stream is then passed through third bed 3.

Figure 3:
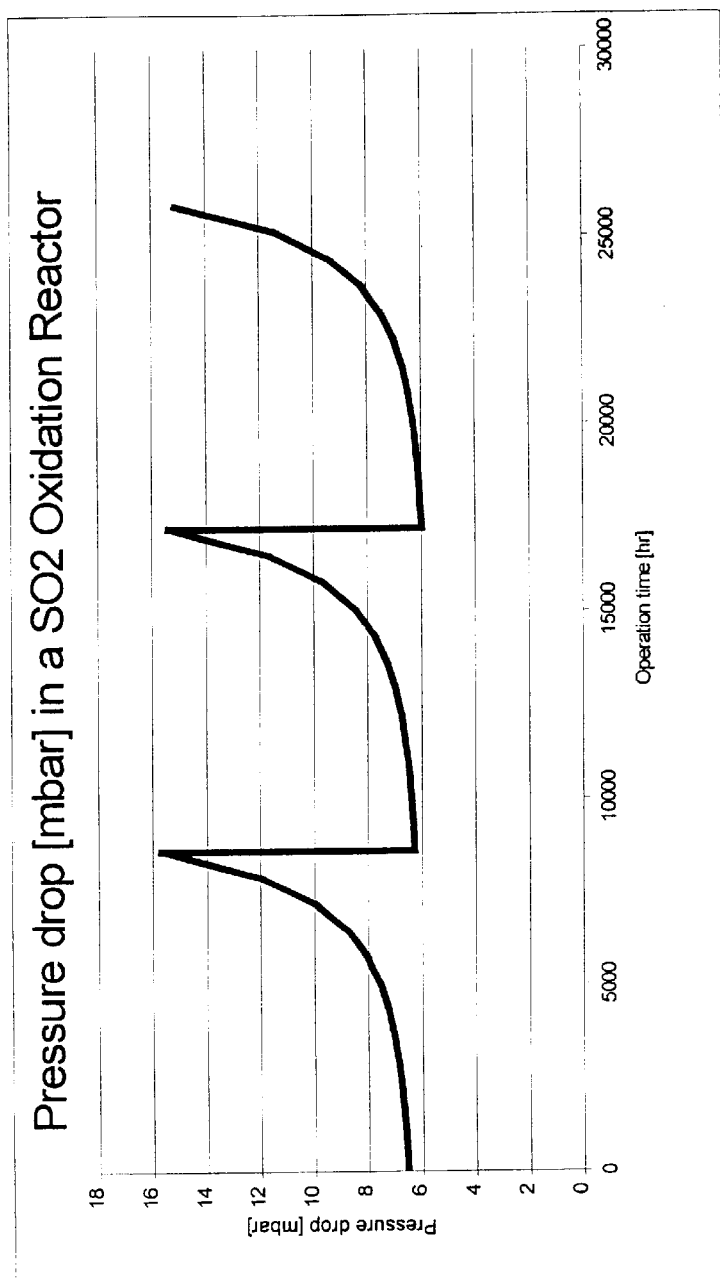
FIG. 3 is a graph of pressure drop versus operation time for the $SO_2$ oxidation reactor depicted in FIG. 2.

The pressure drop versus operation time is shown in FIG. 3.

Thus, the reactor according to the above disclosed embodiment of the invention will on stream for two additional pressures drop build-up periods compared to conventional reactors. The overall period of continuous operation is thereby increased to 3 years.

What is claimed is:

1. A process for treating a dust containing feed stream in a reaction zone loaded with particles, of which at least a part is active in the reaction of the stream, wherein dedusting of the feed stream is performed in the reaction zone simultaneously with reactions proceeding therein and the particles are loaded into a series of beds, numbered $n_b$, the process comprising the steps of:

(a) arranging the particles in the series of beds, numbered $n_b$;

(b) during a first period of time equal to the time necessary for the pressure drop across bed $n_1$ to rise from an initial value to a final value, passing the main part of the feed stream through all of the beds;

(c) during a second period of time equal to the time necessary for the pressure drop across bed $n_2$ to rise from an initial value to a final value, bypassing the bed in which the dust has been deposited during the first period of time by the main part of the feed stream;

(d) during a number of further periods of time $n_t$, wherein $n_t \leq (n_b-2)$, sequentially bypassing a number of beds, on which dust has been deposited, by the main part of the feed stream, and passing the main part of the dust containing feed stream during the last period of time through a last number of beds, $n_{bmin} \geq 1$, containing active particles; and (e) withdrawing a treated feed stream.

2. A process according to claim 1, wherein the particles are in the form of pellets, cylinders, granules, rings, or mixtures thereof.

3. A process according to claim 1, wherein the series of beds of particles is arranged in a common reactor shell.

4. A process according to claim 1, wherein each of the periods of time is determined by a maximum allowable pressure drop across the reaction zone.

5. A process according to claim 1, wherein the number of beds is between 2 and 10.

6. A process according to claim 1, wherein a small fraction of the feed stream is maintained through bed $n_1$.

7. A process according to claim 1, wherein a small fraction of the feed stream is maintained through a last number of beds of particles, bed $n_{bmin} > 1$.

* * * * *